Oct. 9, 1962   F. A. HUSSEY   3,057,043
BIT HOLDER
Filed Aug. 5, 1960

INVENTOR.
Forrest A. Hussey
BY
Robert, Cushman & Grover
ATT'YS

United States Patent Office 3,057,043
Patented Oct. 9, 1962

3,057,043
BIT HOLDER
Forrest A. Hussey, Wilton, N.H., assignor to The O.K. Tool Company, Inc., Milford, N.H., a corporation of New Hampshire
Filed Aug. 5, 1960, Ser. No. 47,676
2 Claims. (Cl. 29—105)

While this invention is applicable to various kinds of bits it is particularly applicable to bits of the throw-away type which have a plurality of cutting edges movable into cutting position successively as they become dull and which are intended to be thrown away after all of the cutting edges have been used. The invention relates especially to bits of the type disclosed in the application of Thurston V. Williams, Sr. No. 856,174, filed November 30, 1959, which have an interior opening for positioning them in a holder.

Objects of the invention are to provide a bit holder which is simple and economical in construction, which holds a bit in position accurately and firmly, which can be operated easily and quickly, and which is durable and reliable in use.

According to this invention the tool comprises a holder having a recess in which is mounted a bit having one face seating against one side of the recess with its cutting edge projecting from the recess and having an opening in the aforesaid face, a clamp for holding the bit in the recess, the recess having a slot in the aforesaid side, with a locator projecting through the slot into the aforesaid opening, and means for adjusting the locator lengthwise of the slot so as to adjust the position of the bit in the recess and firmly hold it in position. Preferably the adjusting means comprises a screw accessible from the aforesaid side of the holder and the part of the locator projecting through the slot comprises a ball, the diameter of the ball being greater than the width of the slot, the aforesaid opening in the bit being circular and having a diameter approximating the diameter of the portion of the ball which projects through the slot.

Figure 1:
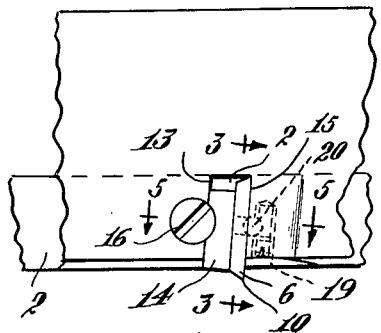
Figure 3:
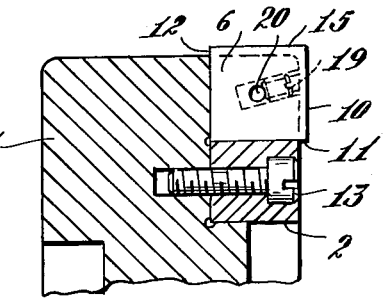
Figure 2:
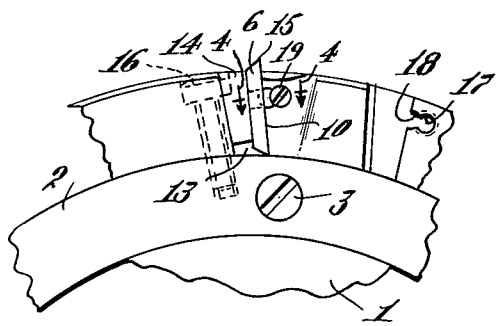
Figure 4:
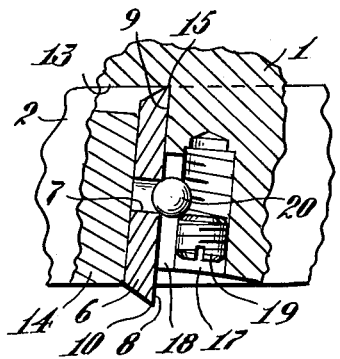
Figure 6:
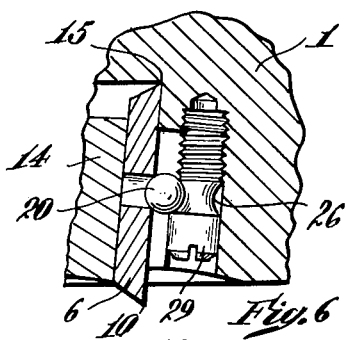
Figure 7:
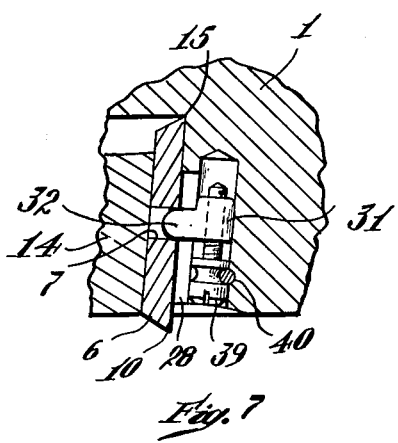
Figure 5:
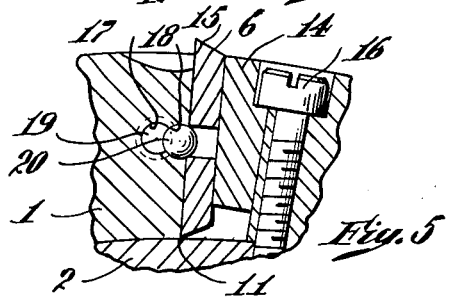

For the purpose of illustration typical embodiments of the invention are shown in the accompanying drawings in which FIG. 1 is a side view of a rotary tool;
FIG. 2 is an end view of the tool;
FIG. 3 is a section of line 3—3 of FIG. 1;
FIG. 4 is a section of line 4—4 of FIG. 2;
FIG. 5 is a section of line 5—5 of FIG. 1; and
FIGS. 6 and 7 are sections like FIG. 4 showing modifications.

The particular embodiment of the invention shown in FIGS. 1 to 5 comprises a rotary head 1 and a bearing ring 2 mounted in an angular recess in the end of the head by means of screws 3. Distributed around the periphery of the head is a series of recesses the bottoms of which comprise the ring 2. Mounted in the recesses are bits 6 which are like those disclosed in the aforesaid application except in that they have round openings 7 instead of square openings. The forward face 8 of each bit seats against the leading side 9 of its recess with one edge 11 seating against the ring 2 and an edge 12 seating against the end side 13 of the recess, the other two edges 10 and 15 projecting beyond the end and peripheral faces of the head 1. Bearing against the rear face of the bit is a clamp 14 which is wedged against the bit by means of a screw 16.

According to the present invention the head 1 has a slot in the forward side of each bit recess, the slot comprising a cylindrical threaded portion 17 opening into the bit recess through a narrow portion 18. These two portions are preferably formed by drills of different sizes, a larger drill for the portion 17 and a smaller drill for the portion 18. Threaded into the larger portion 17 is a screw 19 and fitting in the portion 18 is a ball 20 having a radius slightly less than that of 18. As shown in FIGS. 4 and 5 the diameter of the ball is greater than the width at the opening of the slot 18 into the bit recess and the diameter of the portion of the ball which projects from the slot into the recess approximates the diameter of the opening 7 in the bit. As shown in FIG. 3 the slot 17—18 extends obliquely to the axis of the tool. Thus when the screw 19 is threaded inwardly the bit 6 is seated tightly against the ring 2 and the inner end 13 of the bit recess.

In operation the parts are assembled as shown and then, before the clamp 14 is tightly wedged in position, the screw 19 is advanced to seat the bit firmly against the bottom and end of the recess, after which the clamp 14 is tightly wedged in position.

The modification shown in FIG. 6 is like the embodiment shown in FIGS. 1 to 5 and the parts are correspondingly designated. However the ball 20 seats in an angular groove 20 in the screw 29 so that the ball may be moved outwardly as well as inwardly by means of the screw.

The modification shown in FIG. 7 differs in that the larger portion 27 of the slot is not threaded and the smaller portion 28 has parallel sidewalls and the ball is replaced by a locator comprising a cylindrical portion 31 fitting the larger portion 27 of the slot and a nose 32 extending through the smaller portion 28 of the slot with a spherical end fitting into the opening 7 in the bit. The screw 39 is threaded into the locator and is held against axial movement by a pin 40 fitting into a groove in the head of the screw. Thus by rotating the screw the locator may be moved either inwardly or outwardly.

The angle of the slot and its location relatively to the bit edges 11 should of course be such as to seat the edges 11 and 12 at substantially the same time. The opening 7 should be somewhat larger than the portion of the locator (20 or 32) which extends into the opening to provide lost-motion so that if one of the edges (11 or 12) seats before the other the lost-motion permits the other edge to seat also.

It should be understood that the present disclosure is for the purpose of illustration only and that this invention includes all modifications and equivalents which fall within the scope of the appended claims.

I claim:
1. A tool comprising a holder having, in one side thereof, a bit recess and, in parallel juxtaposition to one side of the recess, a slot having a cylindrical bore portion and a narrow portion interconnecting the bore portion and recess, a bit having one face seating against said side of the recess with its cutting edge projecting from the recess on said side of the holder, the bit having an opening in said face, and locating means adjustable back and forth in said bore portion, the width of said narrow portion being less than the diameter of the bore portion, and said locating means comprising a part having a diameter wider than said narrow portion and another part projecting through the narrow portion into said opening.
2. A tool according to claim 1 wherein said locating means comprises a screw and a ball, the screw being threaded into said bore and having an annular groove in its periphery, and the ball fitting into said opening and groove and having a diameter larger than the opening.

References Cited in the file of this patent

UNITED STATES PATENTS

| | | |
|---|---|---|
| 663,455 | Muehlberg | Dec. 11, 1900 |
| 1,964,786 | McLean | July 3, 1934 |
| 2,382,911 | Pringle | Aug. 14, 1945 |
| 2,400,856 | Thompson | May 21, 1946 |
| 2,751,663 | Leuzinger | June 26, 1956 |

FOREIGN PATENTS

| | | |
|---|---|---|
| 213,925 | Australia | Mar. 25, 1958 |